Patented Nov. 8, 1949

2,487,263

UNITED STATES PATENT OFFICE 2,487,263

COAGULATION OF SYNTHETIC RUBBER LATICES

William J. Mueller, Charleston, W. Va., assignor to United States Rubber Company, New York, N. Y., a corporation of New Jersey No Drawing. Application October 12, 1945, Serial No. 622,091

6 Claims. (Cl. 260—85.1)

This invention relates to improvements in the coagulation of synthetic rubber latices.

Synthetic rubber latices, as is known, may be prepared by the emulsion polymerization in an aqueous medium of butadienes-1,3 or mixtures of butadienes-1,3 with other polymerizable compounds capable of forming copolymers with butadienes-1,3. Where water-soluble soaps of soap-forming monocarboxylic acids, such as the alkali-metal and ammonium salts of palmitic, oleic, lauric, myristic, abietic acids and the like, have been used as the emulsifying agents for the polymerizable materials, it has been suggested to coagulate the synthetic rubber latices with aqueous solutions of various acids, such as sulfuric acid, phosphoric acid, hydrochloric acid, formic acid and acetic acid. When the coagulation is carried out by such acids, however, the rubber separates in the form of an unsuitable tacky cohesive mass, whereas it is desired to coagulate the synthetic rubber in the form of discrete non-coherent crumbs which may be readily filtered and washed before drying. It is known to coagulate the synthetic rubber latices with aqueous solutions of such acids in the presence of an alkali-metal salt, such as sodium chloride, which coagulates the rubber in the form of non-coherent discrete crumbs which are readily filtered, washed and dried. Similarly, the use of aqueous solutions of aluminum sulfate or alum as the coagulant will give satisfactory crumb coagulates for further processing. The use of an alkali-metal salt or an aluminum salt in the coagulating step, however, while it improves the processing of the rubber, produces a rubber which is high in electrolytes by virtue of the occlusion of the salt in the final crude rubber product. This results in a rubber which has high electrical conductivity and high water absorption, and these properties make such rubbers unsatisfactory for many purposes where low water-absorption and high electrical resistance are desired.

In carrying out the present invention, the synthetic rubber latex containing a water-soluble soap of a soap-forming monocarboxylic acid is coagulated by mixing that latex with an aqueous solution of an acid and glue. The glue, which may be any of the well known commercial products, permits the coagulation of the rubber in the form of discrete non-coherent crumbs which may be readily filtered, washed and dried, and the crude rubber thus formed has considerably lower water absorption properties than similar rubbers coagulated by means of acid and sodium chloride, which is the salt commonly used together with sulfuric acid in commercial practices. The rubber also has a much lower ash content showing reduced occlusion of non-volatile materials. The amount of glue is not critical, a range of from 0.05 to 10 parts, and preferably from 0.2 to 1.0 part, per 100 parts of synthetic rubber latex solids being satisfactory. The acid should be added in sufficient amounts to reduce the pH of the synthetic rubber latex to below 6, and this may be accomplished by means of an acid solution of any desired concentration, for example, 0.05 to 10% sulfuric acid in aqueous solution.

In the preparation of synthetic rubber latices, as is known, polymerizable monomeric compounds are emulsified in an aqueous medium by means of an emulsifying agent, such as a water-soluble soap, and the polymerization is made to take place generally at elevated temperatures in the presence of a catalyst and other regulating materials. The monomeric compounds do not completely polymerize and after the desired amount of polymerization has taken place, the unreacted monomers are removed from the synthetic rubber latex, as by venting off gaseous monomers and steam distilling liquid monomers. Examples of water-soluble soaps are the alkali-metal and ammonium salts of the soap-forming monocarboxylic acids, such as the alkali soaps of abietic acid and of aliphatic acids having chains of 8 to 24 carbon atoms in the molecule, for example, alkali soaps of caprylic, pelargonic, capric, lauric, palmitic, stearic, oleic, linoleic acids, and the like. The term "alkali soaps" is conventionally used herein as the generic term which includes alkali-metal and ammonium soaps, and is further used in its commonly accepted sense as exclusive of the alkali-earth and other polyvalent-metal water-insoluble soaps. Examples of polymerizable materials in the preparation of synthetic rubber latices are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3. The polymerizable material as known may be a mixture of such butadienes-1,3 with other polymerizable compounds which are capable of forming rubbery copolymers with butadienes-1,3, for example, up to 70% of such mixture of a compound which contains a $CH_2=C<$ group where at least one of the disconnected valences is attached to an electro-active group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene, the alpha methylene carboxylic acids, and their esters, nitriles and amides, such as acrylic acid, methyl acrylate, methyl methacrylate, acrylonitrile, methacrylonitrile, methacrylamide; isobutylene; methyl vinyl ether; methyl vinyl ketone; vinylidene chloride. Present day commercial synthetic rubbers of the above types are polymerized chloro-2-butadiene-1,3, known as neoprene or GR-M rubber, copolymers of butadiene-1,3 and styrene, known as Buna S or GR-S rubber, and copolymers of butadiene-1,3 and acrylonitrile, known as Buna N or GR-A rubber.

The following is illustrative of the invention:

A synthetic rubber latex was prepared by heating for 14 hours at about 50° C. an emulsion of 72 parts of butadiene-1,3 and 28 parts of styrene in 180 parts of water. The emulsion contained 5 parts of fatty acid soaps (sodium stearate and sodium laurate) as emulsifying agent, 0.3 part of potassium persulfate as an oxidizing catalyst and 0.5 part of dodecyl mercaptan as the so-called regulator. After heating 14 hours approximately 77% of the butadiene and styrene was copolymerized and the unreacted butadiene-1,3 monomer was vented off as a gas and the unreacted styrene was steam distilled. This is a conventional procedure for the manufacture of GR-S latex. The thus prepared synthetic rubber latex was coagulated as follows: The latex was passed through an atomizer consisting of two concentric pipes which were about 0.125 and 2 inches diameter and which extended about two or three feet below the surface of coagulant in a conventional coagulating tank which was about five feet in diameter and five feed deep. Air was blown through the inner of the two concentric pipes and latex was admitted to the annular space between the two concentric pipes at the rate of 30 gallons per minute. The rapidly moving air stream at the bottom of the atomizer broke up the latex stream into small droplets and these were blown into the coagulant solution in the tank. The coagulation took place at 120° F. The latex as fed into the atomizer had a pH of 9.5. The amounts of latex and coagulant were regulated so that the pH of the aqueous medium at the completion of the coagulation was 2.5. The coagulant in the tank consisted of an aqueous solution of .17% sulfuric acid and .05% glue. The coagulated GR-S rubber separated as small discrete non-coherent crumb particles which were readily washed and dried. An analysis of the GR-S rubber showed .35% ash as compared with an ash of .99% on a GR-S rubber coagulated from the same latex with sodium chloride and sulfuric acid. The water absorption (at 70° C. for twenty hours as measured on 2" x 5" test pieces 0.070" thick following the wire and cable standard Rubber Reserve test) on GR-S rubber coagulated with sulfuric acid and glue according to the present invention was 2.02 mg. per cm.$^2$ as compared with a water absorption of 5.89 mg. per cm.$^2$ of GR-S rubber coagulated with sodium chloride and sulfuric acid. The specific electrical resistivity (as measured on 1⅜" diameter discs with an average gauge of 0.075") of GR-S rubber coagulated with sulfuric acid and glue according to the present invention was 155 megohm-cm. as compared with an electrical resistance of similar discs of GR-S rubber coagulated with sodium chloride and sulfuric acid of 46 megohm-cm.

The above example shows a coagulation of a synthetic rubber latex by means of an aqueous solution of sulfuric acid and glue by the so-called "atomizer method" where the latex is atomized before passing into the coagulant solution. This is one of the common methods used today in coagulation of synthetic rubber latices. Other conventional methods of coagulation may be used, as for example, multiple agitation of the latex and coagulant in the tank as by means of multiple impellers in the tank with individual feeds of the latex and coagulant. Also the synthetic rubber latex and coagulant may be coagulated by means of a centrifugal pump where both the latex and acid are fed into the pump and then dumped into the coagulating tank. All these methods are well known, and the present method of coagulating the synthetic rubber latex with an aqueous solution of acid and glue may be utilized with any of them.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of coagulating a synthetic rubber latex prepared by the polymerization of an aqueous emulsion consisting of water, a water-soluble soap of a soap-forming monocarboxylic acid, polymerization catalyst, polymerization regulator and polymerizable material selected from the group consisting of butadienes-1,3 and mixtures of butadienes-1,3 with other polymerizable compounds capable of forming copolymers with butadienes-1,3 which consists in mixing said synthetic rubber latex directly with an aqueous solution consisting of water, sulfuric acid and glue to form non-coherent particles of coagulum, said sulfuric acid being 0.05 to 10% concentration and in amount to reduce the pH of the latex to below 6, and said glue being from 0.05 to 10 parts per 100 parts of synthetic rubber solids, and washing and drying said coagulum particles.

2. The method of coagulating a synthetic rubber latex prepared by the polymerization of an aqueous emulsion consisting of water, a water-soluble soap of a soap-forming monocarboxylic acid, polymerization catalyst polymerization regulator and polymerizable material selected from the group consisting of butadienes-1,3 and mixtures of butadienes-1,3 with other polymerizable compounds capable of forming copolymers with butadienes-1,3 which consists in mixing said synthetic rubber latex directly with an aqueous solution consisting of water, sulfuric acid and glue to form non-coherent particles of coagulum, said sulfuric acid being 0.05 to 10% concentration and in amount to reduce the pH of the latex to below 6, and said glue being from 0.2 to 1 part per 100 parts of synthetic rubber solids, and washing and drying said coagulum particles.

3. The method of coagulating a synthetic rubber latex prepared by the polymerization of an aqueous emulsion consisting of water, a water-soluble soap of a soap-forming monocarboxylic acid, polymerization catalyst, polymerization regulator and butadiene-1,3 and a compound which contains a $CH_2=C<$ group and is copolymerizable with butadiene-1,3 which consists in mixing said synthetic rubber latex directly with an aqueous solution consisting of water, sulfuric acid and glue to form non-coherent particles of coagulum, said sulfuric acid being 0.05 to 10% concentration and in amount to reduce the pH of the latex to below 6, and said glue being from 0.05 to 10 parts per 100 parts of synthetic rubber solids, and washing and drying said coagulum particles.

4. The method of coagulating a synthetic rubber latex prepared by the polymerization of an aqueous emulsion consisting of water, a water-soluble soap of a soap-forming monocarboxylic acid, polymerization catalyst, polymerization regulator and butadiene-1,3 and a compound which contains a $CH_2=C<$ group and is copolymerizable with butadiene-1,3 which consists in mixing said synthetic rubber latex directly with an aqueous solution consisting of water, sulfuric acid and glue to form non-coherent particles of coagulum, said sulfuric acid being 0.05 to 10% concentration and in amount to reduce the pH of the latex to below 6, and said glue being from 0.2 to 1 part per 100 parts of synthetic rubber solids, and washing and drying said coagulum particles.

5. The method of coagulating a synthetic rubber latex prepared by the polymerization of an aqueous emulsion consisting of water, a water-soluble soap of a soap-forming monocarboxylic acid, polymerization catalyst, polymerization regulator and butadiene-1,3 and styrene which consists in mixing said synthetic rubber latex directly with an aqueous solution consisting of water, sulfuric acid and glue to form noncoherent particles of coagulum, said sulfuric acid being 0.05 to 10% concentration and in amount to reduce the pH of the latex to below 6, and said glue being from 0.05 to 10 parts per 100 parts of synthetic rubber solids, and washing and drying said coagulum particles.

6. The method of coagulating a synthetic rubber latex prepared by the polymerization of an aqueous emulsion consisting of water, a water-soluble soap of a soap-forming monocarboxylic acid, polymerization catalyst, polymerization regulator and butadiene-1,3 and styrene which consists in mixing said synthetic rubber latex directly with an aqueous solution consisting of water, sulfuric acid and glue to form noncoherent particles of coagulum, said sulfuric acid being 0.05 to 10% concentration and in amount to reduce the pH of the latex to below 6, and said glue being from 0.2 to 1 part per 100 parts of synthetic rubber solids, and washing and drying said coagulum particles.

WILLIAM J. MUELLER.

REFERENCES CITED

The following references are of record in the file of this patent:

UNITED STATES PATENTS

| Number | Name | Date |
| --- | --- | --- |
| 1,896,491 | Luther | Feb. 7, 1933 |
| 2,340,358 | Young | Feb. 1, 1944 |
| 2,366,460 | Semon | Jan. 2, 1945 |
| 2,424,628 | Bixby | July 19, 1947 |
| 2,424,648 | Bixby | July 29, 1947 |